(12) United States Patent
Rittmann et al.

(10) Patent No.: US 8,783,956 B2
(45) Date of Patent: Jul. 22, 2014

(54) DIRT DEPOSITORIES IN SLIDING BEARINGS

(75) Inventors: Stefan Rittmann, Kirchheimbolanden (DE); Thomas Aubele, Undenheim (DE); Karsten Bresser, Eltville (DE)

(73) Assignee: Federal-Mogul Wiesbaden GmbH, Wiesbaden (DE)

(*) Notice: Subject to any disclaimer, the term of this patent is extended or adjusted under 35 U.S.C. 154(b) by 0 days.

(21) Appl. No.: 13/820,220

(22) PCT Filed: Sep. 1, 2011

(86) PCT No.: PCT/EP2011/065093
§ 371 (c)(1),
(2), (4) Date: May 13, 2013

(87) PCT Pub. No.: WO2012/028682
PCT Pub. Date: Mar. 8, 2012

(65) Prior Publication Data
US 2013/0230264 A1  Sep. 5, 2013

(30) Foreign Application Priority Data
Sep. 2, 2010 (DE) .......................... 10 2010 040 154

(51) Int. Cl.
*F16C 33/10* (2006.01)

(52) U.S. Cl.
USPC .......................................... 384/322; 384/291

(58) Field of Classification Search
USPC .................. 384/129, 286–292, 322, 385, 397
See application file for complete search history.

(56) References Cited

U.S. PATENT DOCUMENTS

| 3,043,636 A * | 7/1962 | MacInnes et al. ............ 384/287 |
| 3,058,791 A | 10/1962 | Stallman |
| 4,427,309 A * | 1/1984 | Blake ............................ 384/286 |
| 5,667,310 A | 9/1997 | Oyagi et al. |
| 7,318,847 B2 | 1/2008 | Massler et al. |
| 2007/0059157 A1 | 3/2007 | Dellmann |
| 2008/0187259 A1 | 8/2008 | Ishigo et al. |
| 2010/0135603 A1 | 6/2010 | Klein et al. |

FOREIGN PATENT DOCUMENTS

| DE | 1525266 A1 | 9/1969 |
| DE | 3024629 A1 | 2/1982 |
| DE | 258149 A3 | 7/1988 |
| DE | 3905450 C2 | 7/1998 |
| DE | 102005037502 A | 3/2007 |

(Continued)

*Primary Examiner* — Phillip A Johnson
(74) *Attorney, Agent, or Firm* — Robert L. Stearns; Dickinson Wright, PLLC

(57) ABSTRACT

A plain bearing having a depository surface which has at least one depository and which is a sliding surface and/or a surface of an oil supply groove, wherein the depository is a cutout which is open in the direction of the depository surface and which has a depository a wall and which extends away from the depository surface into the bearing, wherein the depository wall, in the direction of extent, forms an acute angle with a reference direction, wherein the reference direction is the tangent to the depository surface at the point at which the depository wall intersects the depository surface in the direction away from the depository.

9 Claims, 2 Drawing Sheets

(56) References Cited

FOREIGN PATENT DOCUMENTS

| DE | 102007046010 A1 | 4/2008 |
| DE | 102009007847 A1 | 8/2010 |
| GB | 1128370 A | 9/1968 |
| JP | 61088023 A | 5/1986 |
| JP | 5044729 A | 2/1993 |
| JP | 5202936 A | 8/1993 |
| JP | 2007016995 A * | 1/2007 |
| JP | 2008151200 A | 7/2008 |
| JP | 2009068511 A | 4/2009 |

* cited by examiner

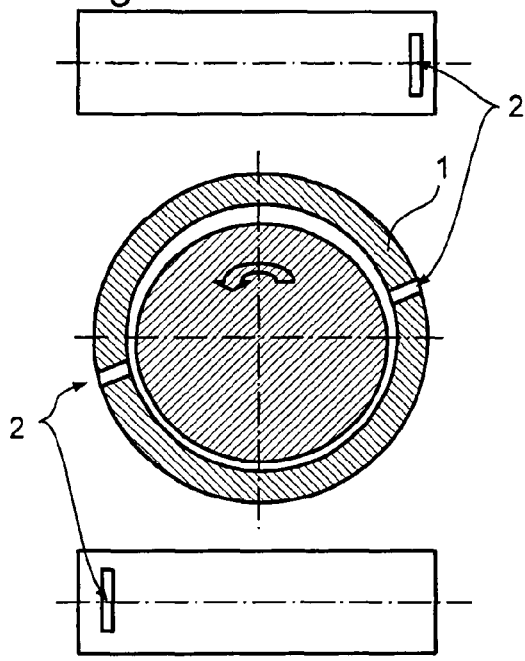
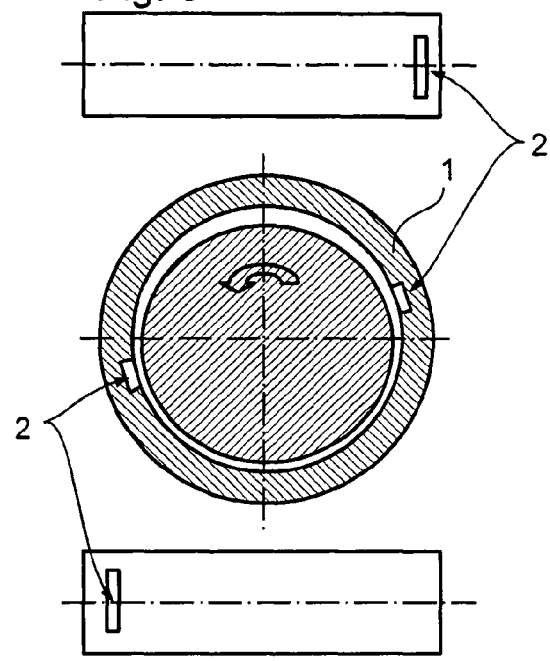
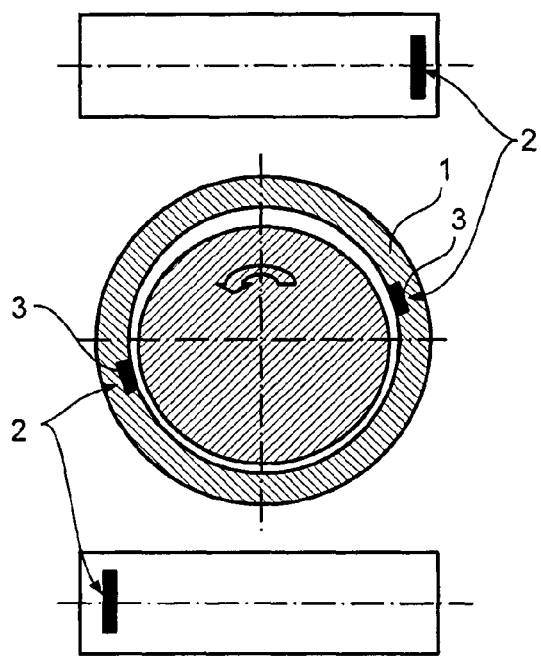
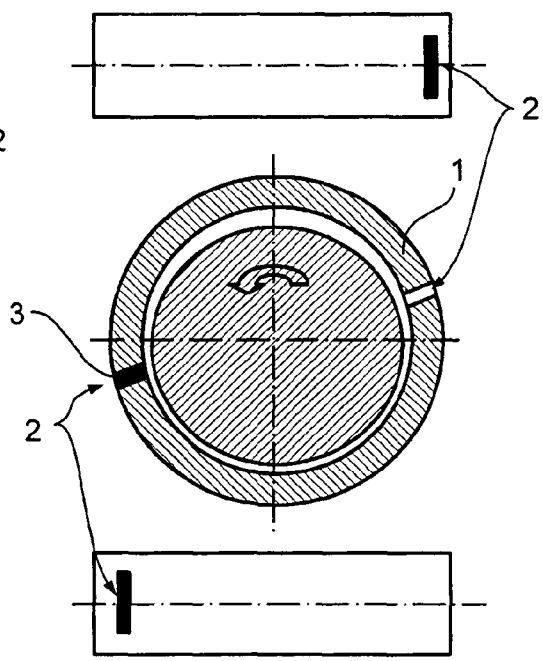

DIRT DEPOSITORIES IN SLIDING BEARINGS

BACKGROUND OF THE INVENTION

1. Technical Field

The invention relates to sliding bearings having a depository surface having at least one depository, which is a sliding surface and/or a surface of an oil supply groove, the depository being a recess open towards the depository surface and having a depository wall extending from the depository surface in the direction towards the bearing back.

2. Related Art

The sliding surfaces of sliding bearings are profiled for various reasons. For example, in DE 39 05 450 C2 it was proposed to provide sliding bearings with grooves that are filled with a soft material so that the harder material alternates with the softer material in the sliding surface in order to achieve a better wear resistance and fatigue strength.

GB 1,128,370 A describes a lubricant-free bearing in which recesses are formed in the sliding surface in the form of grooves or pockets to convey dirt particles out of the bearing. Foreign bodies that penetrate into the bearing are collected in the recesses and are transported in the direction of rotation of the shaft along the flanks of the recesses and conveyed out of the bearing at the ends of the bearing.

Sliding bearings in internal combustion engines are the subject of continuous further development. Continuously greater stress is occurring in internal combustion engines and therefore also on sliding bearings. At the same time, the size of engines is being reduced. Moreover, ever thinner oils are being used to reduce friction. This results in that the thickness of the lubricating films which prevent contact between the bearing and the shaft is constantly becoming less.

Consequently, the system is becoming more and more susceptible to unwanted external influences such as the intrusion of large dirt particles and chips for example during the manufacture of the components, which can never be completely avoided.

Furthermore, the structure of the bearing shell is changing. Lead, which has very good sliding properties, is being replaced by other elements. The stress capacity of the bearing is also being increased, and this is resulting in a greater susceptibility to external influences. Layers that withstand great stress are as a rule thinner and harder than conventional layers and this entails a lesser embeddability, i.e. the capability to embed hard particles into the sliding surface to reduce wear. By substituting lead-containing layers, the remaining slidability of a damaged layer is also reduced. This also reduces the embeddability, with the consequentially reduced operational safety of the bearing. If there is an intrusion of foreign bodies, the bearing will therefore be damaged to a greater extent than hitherto, and this can result in a total failure of the tribo-system.

Foreign particles can have various origins and reach the oil circuit in different ways. For example, dirt resulting from the manufacture of the components, such as bore chips, welding or soldering residue, residual dirt from individual components from the packaging etc., can damage the bearing. Moreover, wear particles for example from oil pumps or chain tensioners or combustion residues from agglutinated and burned hydrocarbon compounds may penetrate the bearing. In addition, foreign particles from maintenance work or contaminants in the oil when changing the oil may lead to damage to the bearing.

The foreign bodies may be several times larger than the bearing play, and therefore cannot easily be washed out of the bearing. They move in the direction of the flow of oil towards the end of the oil supply bore and the discharge of the foreign bodies is prevented by the bearing. Thus, the foreign particles are then pulled from the oil supply bore in a circumferential direction over the susceptible sliding bearing surface, thereby damaging the bearing by the formation of scoring. In extreme cases, the foreign body tries to leave the bearing in the area of least resistance, i.e. in the area of exposure (the greatest width of the gap), and is carried as a consequence of the wedge effect between the shaft and exposure by the shaft up until deep into the stressed areas of the bearing. Such damage generally leads to a complete failure of the bearing.

SUMMARY OF THE INVENTION

To counteract the problems outlined above, the background of the invention is, and one object of the invention consists in, the reduction of the susceptibility of a lubricated bearing as regards the impact of foreign particles.

The sliding bearing has at least one depository on the sliding surface and/or in the oil supply groove. To be more precise, the one or the plural depositories can be located both on the sliding surface as well as also on a surface of the oil supply groove, which are jointly designated as the depository surface. The depository is a recess that is open towards the depository surface. The depository extends into the bearing, this means in the case of a depository of the sliding surface in the axial direction towards the bearing back. The depository is restricted by one or plural depository walls and thus forms a pocket-like recess, a pocket hole, a through-hole or the like. The preferred direction of the depository angle in the direction towards the bearing back is dependent on the shaft rotation direction, i.e. such that collected foreign bodies cannot be washed out of the depository. To be more precise, the depository wall forms in the extension direction with a reference direction an acute angle, with the reference direction being selected to be parallel to the tangent of the depository surface at the intersection of the depository wall with the depository surface. With this, the angle is selected that is formed of the depository wall in the direction of extension and the tangent in the direction away from the depository. In other words, at least one depository wall is incorporated into the bearing at an inclination, i.e. such that when the shaft rotates in the bearing a foreign body in the depository cannot be washed out of the depository, on the contrary it gets wedged therein. By this means, the dangerous foreign bodies are fixed in the one or the plural depositories, by which damage to the functional surface of the bearing is avoided or at least reduced. The function of the bearing system is thus maintained even in extreme cases. Even with main bearings, depositories can also be integrated into the oil supply groove of a bearing or a bearing shell in order to prevent foreign bodies from being washed by the flow of oil into the sliding surfaces of the bearing. In such a case, the direction of incorporation of the depository as defined more precisely above is such that the directed oil flow cannot wash out foreign particles from the depository.

Preferably, the depository for the fixation of the foreign bodies is a pocket hole. In this case, the depository does not penetrate through the back of the bearing, which can be sensible depending on the production method or the field of use of the bearing. Furthermore, a depository of this kind can be easily produced.

On the other hand, the depository can penetrate the back of the bearing and thus be configured as a through-hole so as by this means to maximize the holding capacity and/or to be able to discharge foreign particles from the bearing.

Preferably, the sliding bearing comprises an exposure area and the depository is provided in the area or in the vicinity of the exposure area. An exposure area is understood to be an area at the bearing ends of a bearing shell which form the bearing in which the wall strength of the bearing shell is reduced as compared to the wall strength of the remainder of the bearing shell. By this means, the wear on one of the shafts running in the bearing shell owing to the inexactness at the connecting points of the two bearing shells can be reduced. In principle, it is to be achieved that the one or plural depositories are provided if possible not in the main stress zone of the bearing so as to fix the dangerous foreign bodies in the depository in the non-stress area of the bearing. Furthermore, the discharge of the foreign body from the oil discharge bore is to be expected in the vicinity of the exposure area or the exposure areas. Since the depositories are provided preferably for larger particles, an arrangement of the depositories in low-stress areas of the bearing does not worsen the depository capability of the particles in the depositories.

For the same reason, the depository is provided preferably at the edge area of the bearing, as seen in axial direction, i.e. in the vicinity of the side where the shafts enter or exit. This is supposed to prevent the foreign particles from reaching the high stress areas of the bearing.

The holding capacity of the depository preferably corresponds to the multiple volume of foreign bodies present in the engine, i.e. particles up to a dimension of, for example, approximately a maximum of length×width×height=3 mm×2 mm×1 mm or 2 mm×2 mm×2 mm or a diameter of 2 mm.

Preferably, in view of a minimum effort in production, the depository is incorporated by means of embossing, boring, milling, laser cutting, ECM or punching.

Preferably, the cross-section of the depository perpendicular to the direction of extension of the depository is cylindrical, oval or rectangular so as to easily produce a local, pocket-like recess.

Preferably, a filler is introduced into the depository that is softer than the material of the bearing. In this case, the foreign bodies are better fixed against being washed out. Moreover, the hydrodynamic lubricating film structure is not destroyed by edges when the film material is flush with the depository surface.

Preferably, the softer material comprises elastomers, polymers, metals, alloys and/or a metal foam.

Preferably, plural depositories are present that can be provided with the above-described properties. For this, not all depositories have to have the same configuration, position, size, etc., but can be different and can meet different requirements or partial requirements.

The above-mentioned object is achieved with a bearing shell comprising at least one depository. One or plural depositories may be provided in the embodiment variants described above. Preferably, precisely one depository is provided in a bearing shell in order to avoid an excessive reduction of the running surface. In this case, the bearing comprises precisely two depositories.

BRIEF DESCRIPTION OF THE DRAWINGS

FIG. 4 is a view as according to FIG. 1 with a rectangular depository cross-section;

FIG. 5 is a view as according to FIG. 1 with depository pockets;

FIG. 6 is a view as according to FIG. 1 with depository pockets into which a filler is introduced;

FIG. 7 is a view as according to FIG. 1 with a continuous depository, a filler material being introduced into one depository.

DETAILED DESCRIPTION

Figure 1:
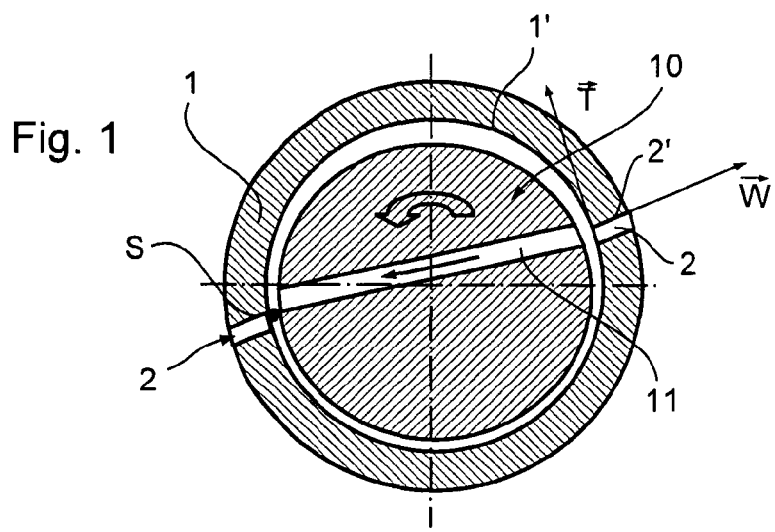
FIG. 1 shows a cross-section of a bearing formed of two bearing shells with a shaft incorporated therein, the bearing having two depositories.

FIG. 1 is a cross-section of a bearing formed of two bearing shells 1. In the bearing a shaft 10 is incorporated that comprises an oil channel having an oil discharge bore 11. The rotational direction of the shaft 10 is shown with an arrow in the upper area of the shaft. According to this, a main stress direction results that is shown with a double arrow. The oil flow direction through the oil discharge bore is also shown. The bearing shells 1 each have a sliding surface 1'. In each of the two bearing shells 1, one depository 2 is formed. The depositories 2 have a cylindrical shape and penetrate the bearing back. The depositories 2 are open towards the sliding surface 1'.

A dirt particle is designated using the reference sign S and is located on the path into the depository 2. By rotating the shaft, the particle is pressed into the depository 2 and is fixed there. The direction of incorporation of the depository 2 into the bearing shell 1 in the direction towards the back of the bearing is such that, corresponding to the rotational direction, the collected foreign bodies cannot be washed out of the depository 2. This means, with reference to FIG. 1, that the two vectors shown, $\vec{W}$ and $\vec{T}$, form an acute angle. The vector $\vec{W}$ designates the direction of the depositary wall 2' in the direction of extension of the depository and in the area of the intersection of the depository wall 2' with the sliding surface 1'. The vector $\vec{T}$ designates the direction along the tangent of the depository surface at the intersection of the depository wall of the depository surface in the direction away from the depository 2.

It is noted that in FIG. 1 only a possible cross-section of the system of a bearing and a depository 2 is shown. The above condition of the angle of the vectors $\vec{T}$ and $\vec{W}$ should at least be met for a substantial part of the depository wall in the axial direction of the bearing, so that the avoidance of a washing out of foreign particles is ensured.

The two depositories 2 are provided in FIG. 1 in the area of the bearing shell ends in which the exposure areas can be provided that are not shown in the figures, however. Furthermore, the depositories are located in the area of the oil discharge bore 11 of the shaft 10 (in axial direction).

Figure 2:
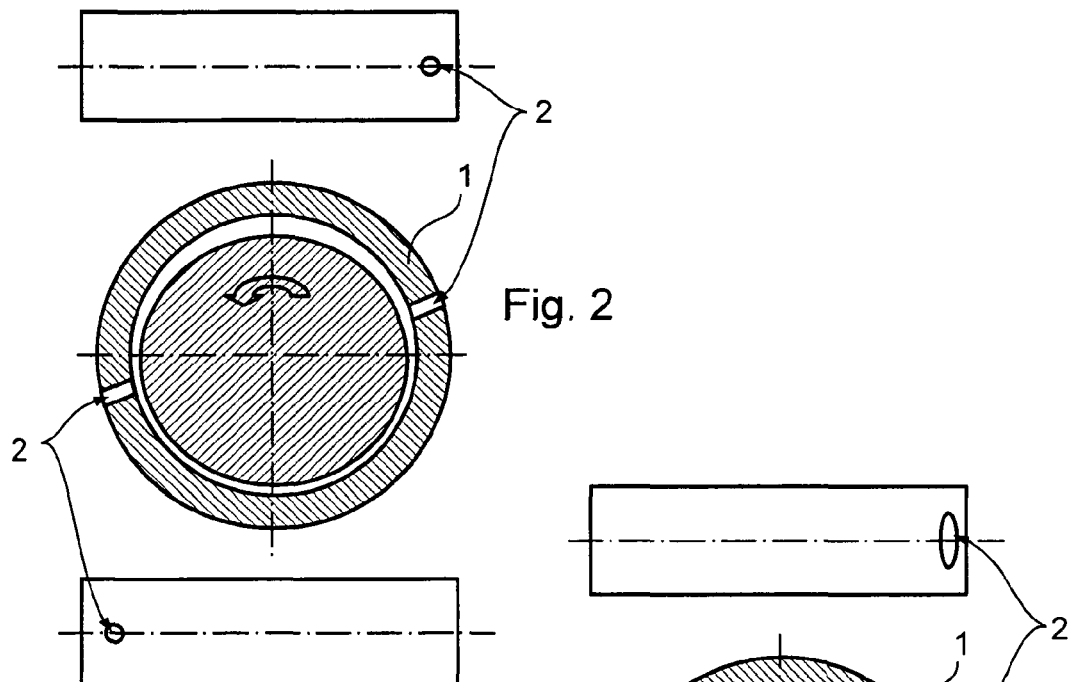
FIG. 2 shows a cross-section as according to FIG. 1 with a circular cylindrical depository cross-section.
Figure 3:
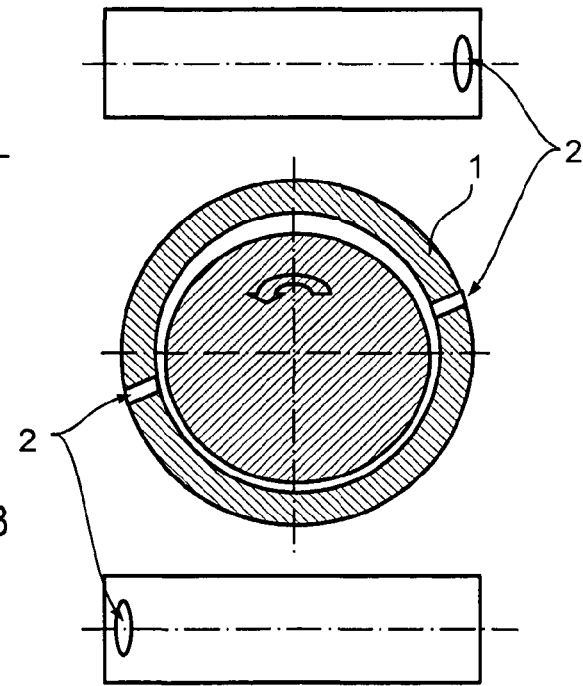
FIG. 3 is a view as according to FIG. 1 with an oval depository cross-section.

FIGS. 2, 3 and 4 each show a view as according to FIG. 1, where a wound-up cross-section of the bearing below and above the bearing is shown. Examples of cross-section forms of the depository 2 in the direction of incorporation of the depository 2 are visible therein. In FIG. 2 a circular cross-section is shown, in FIG. 3 an oval cross-section is shown and in FIG. 4 a rectangular cross-section is shown. It is to be noted that, when plural depositories 2 are provided, the depositories 2 do not have to have a uniform cross-section. The depositories 2 furthermore do not have to have uniform cross-sections along the incorporation direction, but can be formed as irregularly shaped recesses, pocket holes, through-holes, etc.

FIG. 5 is a view as according to FIG. 1, with the depositories 2 being formed as pocket-like recesses that do not penetrate the back of the bearing. Of course, the cross-sections can be differently configured, as is shown in the previous embodiments.

FIG. 6 and FIG. 7 are views as according to FIG. 1, a filler 3 or filling material being introduced in a few of the pocket-shaped depositories 2 and/or the through-holes that act as depositories 2. The filler has the purpose of improving the fixation of trapped foreign particles. Therefore, the filler consists preferably of a material that is softer than the sliding surface 1'.

The invention claimed is:

1. A sliding bearing having, comprising:
a depository surface having at least one depository that is suitable for accommodating foreign particles,
the sliding bearing extending radially from the depository surface to a backing,
the depository surface being a sliding surface and/or a surface of an oil supply groove,
the depository of the depository surface being a pocket hole that is open towards the depository surface and does not penetrate through the backing,
wherein the depository has a depository wall and extends away from the depository surface into the bearing, and
wherein the depository wall forms in the direction of extension with a reference direction an acute angle, the reference direction being the tangent of the depository surface at the intersection of the depository wall with the depository surface in the direction away from the depository.

2. The sliding bearing according to claim 1, wherein the sliding bearing has an exposure area and the depository is provided in the area of the exposure area.

3. The sliding bearing according to claim 1, wherein the depository is provided at an edge area of the bearing in axial direction.

4. The sliding bearing according to claim 1, wherein the holding capacity of the depository corresponds to a multiple volume of the foreign particles occurring, and the depository having a dimension of a maximum of approximately length×width×height=3 mm×2 mm×1 mm or 2 mm×2 mm×2 mm, or a diameter of 2 mm.

5. The sliding bearing according to claim 1, wherein the depository is made by means of embossing, boring, milling, laser cutting, ECM or punching.

6. The sliding bearing according to claim 1, wherein the cross-section of the depository perpendicular to the direction of extension of the depository is cylindrical, oval or rectangular.

7. The sliding bearing according to claim 1, wherein a filler is introduced into the depository, which is softer than the material of the bearing.

8. The sliding bearing according to claim 7, wherein the filler is an elastomer, a polymer, a metal, an alloy or a metal foam.

9. The sliding bearing according to claim 1, wherein, the depository surface includes a plurality of the depositories.

* * * * *